July 10, 1928.

G. A. MONTGOMERY 1,676,275

COMBINED CASING SPIDER AND ELEVATOR

Filed Nov. 8, 1924 2 Sheets-Sheet 1

Inventor,
Gustavus A. Montgomery
by Geyer & Geyer
Attorneys

July 10, 1928.  1,676,275

G. A. MONTGOMERY

COMBINED CASING SPIDER AND ELEVATOR

Filed Nov. 8, 1924  2 Sheets-Sheet 2

Inventor,
G. A. Montgomery,
by Geyer & Geyer
Attorneys.

Patented July 10, 1928.

1,676,275

UNITED STATES PATENT OFFICE.

GUSTAVUS A. MONTGOMERY, OF TITUSVILLE, PENNSYLVANIA, ASSIGNOR TO TITUSVILLE FORGE COMPANY, OF TITUSVILLE, PENNSYLVANIA, A CORPORATION OF MARYLAND.

COMBINED CASING SPIDER AND ELEVATOR.

Application filed November 8, 1924. Serial No. 748,587.

This invention relates to a combined casing spider and elevator for well-drilling apparatus.

One of the principal objects of the invention is to provide a novel and simple device of this character which is so organized that it is capable of reliably supporting the well casing during the drilling operation as well as effectually gripping the casing while raising and lowering the same in the well without danger of its dropping.

Another object is the provision of improved means for mounting and suspending the slips in the casing spider.

A further object of the invention is to provide means operatively connected with the slips for effectually safeguarding the casing or tubing against accidently dropping into the well.

Figure 1:
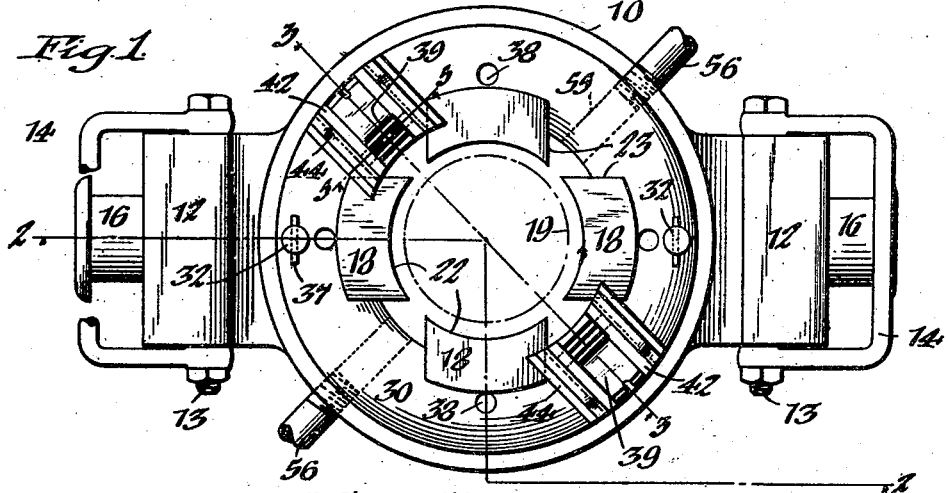
Figure 2:
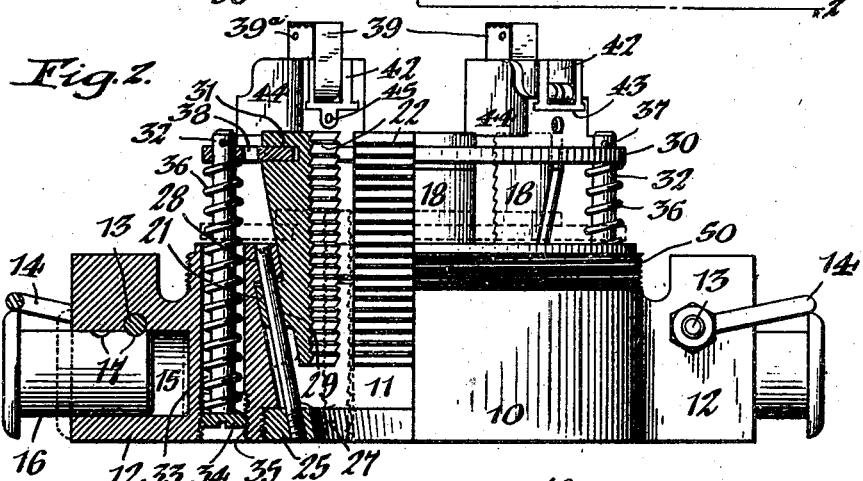
Figure 3:
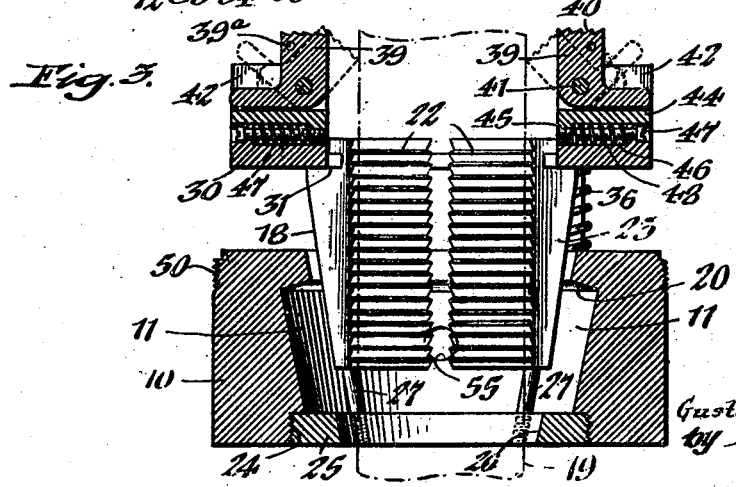
Figure 4:
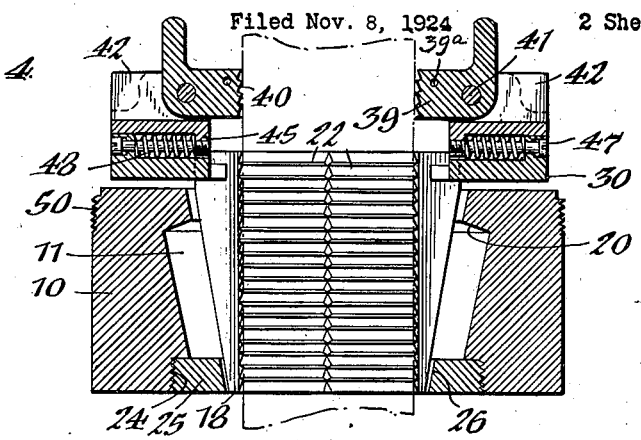
Figure 5:
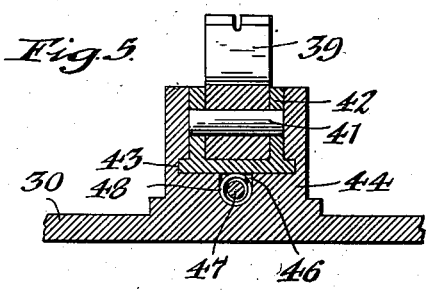

In the accompanying drawings:

Figure 1 is a top plan view of a casing-spider embodying my improvements. Figure 2 is a longitudinal section thereof on line 2—2, Fig. 1. Figure 3 is a transverse section thereof on line 3—3, Fig. 1. Figure 4 is a transverse section, similar to Fig. 3, showing the slips in their lowered contracted position. Figure 5 is an enlarged transverse section on line 5—5, Fig. 1.

Similar characters of reference indicate corresponding parts throughout the several views.

The combined casing spider and elevator comprises a substantially cylindrical body or supporting member 10 containing a conical or tapered central opening 11 and provided on diametrically opposite sides with arms or extensions 12. Mounted on a transverse fulcrum pin or bolt 13 carried by each arm 12 is a suitable bail or handle 14.

In their ends, said arms are provided with horizontal sockets or openings 15 for receiving removable journal pins or trunnions 16 adjustable lengthwise of the sockets to the positions shown by full and dotted lines in Fig. 2. The bolts 13 intersect the corresponding pin-sockets 15 and each journal pin has grooves 17 in its face, one or the other of which is adapted to engage the respective bolt, whereby said journal pins are reliably held in one position or the other. When the device is used as an elevator, the journal pins are in the position shown by full lines in Fig. 2, for connecting the usual reins or links (not shown) thereto, while when used as a spider the pins are set in the position shown by dotted lines, or if desired, they may be removed from their sockets.

Seated in the tapered opening 11 of the supporting member are a plurality of slips or jaws 18 which are arranged in spaced relation in an annular series and which are adapted for movement as a unit into and out of engagement with the pipe or casing 19. Said tapered opening is stepped or staggered, as shown in Fig. 2, and between its conical bearing faces is formed an annular downwardly-facing shoulder 20. These slips 18 are of uniform dimensions and each is provided near the lower end of its outer side with a lug or projection 21, the outer faces of the slips and their lugs being tapered to correspond to the conical bearing walls of the opening 11. The inner or gripping face of each clip has the customary threads or wickers 22 to prevent the casing from slipping downwardly relatively thereto.

As shown in Fig. 1, instead of having the slips 18 sector-shaped with their side walls arranged radially, as has heretofore been the practice, the side walls 23 of each slip are arranged parallel with each other and with a radial line drawn substantially centrally through the slip. By constructing the slip in this manner, a sector of steel is eliminated which serves no useful purpose and which reduces the weight of the slip materially. Furthermore, the outer bearing face of the slip which engages the tapered-opening 11 of the supporting member 10 is reduced circumferentially and more readily adapts itself to said tapered opening.

At its lower end the spider-opening 11 terminates in a screw threaded counter-bore 24 in which a ring or wear member 25 is fitted. The inner face 26 of this ring is beveled to correspond to the taper of the slips, the lower side portions of the latter below their lugs 21 engaging the beveled face of the ring in the lower contracted position of the slips, as shown by dotted lines in Fig. 2. The internal diameter of this ring is such that in the elevated expanded position of the slips 18, its beveled face 26 extends inwardly beyond the inner threaded faces of the slips. By this construction and arrangement, as the casing 19 is raised and lowered relatively to the spider, the ring 25 receives the wear and thereby prevents the casing contacting with the gripping faces of the slips. When working with casings of different sizes, wear rings corresponding to such sizes are employed.

For the purpose of guiding the slips vertically relatively to the supporting member 10, a plurality of substantially upright guide pins 27 are provided, preferably one for each slip. These guide pins are arranged in an annular row in the tapered opening 11 beneath the shoulder 20, being fastened at their lower ends to the ring 25, while their upper ends extend into openings 28 formed in the upper portion of the supporting member. The lugs 21 of the slips have apertures or openings 29 therein which engage the guide pins, the movement of said slips being limited in one direction by their respective lugs contacting with the ring 25 and in the opposite direction by the lugs abutting against the opposing annular shoulder 20. As shown in Figs. 2, the longitudinal axes of these guide pins are substantially parallel with the tapered faces of the slips and the opening 11. In addition to guiding the slips vertically, the guide pins 27 prevent their lateral and circumferential displacement.

The slips are preferably connected as a unit and suspended so that they are retained constantly in horizontal alinement and at the same time self-centering. To this end they are carried by a suspension member preferably in the form of a collector ring 30 which surrounds the upper ends of the slips and engages comparatively deep horizontal recesses or notches 31 formed in the outer sides of said slips adjacent their upper ends. The collector ring is guided for vertical movement on adjustable guide posts 32 which may be located on diametrically opposite sides of the spider-opening 11. The lower portions of these guide posts extend into openings 33 formed in the spider and at their lower ends they are provided with screw-threaded heads 34 which engage the threaded lower parts 35 of the post openings, as shown in Fig. 2. Coil springs 36 applied to the guide posts 33, and bearing at their lower ends against the corresponding post-heads 34 and at their upper ends against the underside of the collector ring 30 tend constantly to move the latter, together with the suspended slips, to its elevated position. By turning the posts in one direction or the other, the tension of the springs 36 may be regulated as desired. Stop pins 37 secured to the upper ends of the guide posts above the collector ring limit the upward movement of the ring on the posts, while its downward movement is limited by the same striking the upper side of the supporting member 10. By this construction and arrangement, the slips 18 are held against vertical displacement relative to the ring and to each other but are capable of independent radial movement to permit their contraction and expansion into and out of engagement with the casing, the slip-notches 31 being of sufficient depth for this purpose.

In order to gain access to the slip guide-pins 27 in the act of assembling and dismembering this device, the collector ring 30 has openings 38 in axial line with said pins through which an appropriate tool may be inserted for applying and removing the guide-pins.

Aside from their function as guides, the posts 32 serve to hold the collector ring 30 against turning relatively to the slips 18.

When used as a spider, the device is placed on the floor of the derrick with the casing 19, which is suspended from suitable elevators, extending through it, the slips 18 at this time being in their normal elevated position out of gripping engagement with the casing, as shown by full lines in Fig. 2. To bring the slips into their operative position for supporting the casing, it is necessary to lower the slips in the tapered opening 11, thereby contracting them about the casing. When the casing is lowered, the load is transmitted to the slips which are forced downward therewith and wedged tightly between the spider and the casing. When the casing is raised and the load is removed from the spider, the springs 36 automatically raise the slips, which are thereby expanded and released from gripping engagement with the casing. In this position, the gripping faces of the slips extend outwardly beyond the beveled face of the wear ring 25, so that during the raising and lowering movements of the casing the teeth 22 of said slips are relieved from wear.

When used as an elevator, the device operates in substantially the same manner as when employed as a spider. The reins or links having been connected to the journal pins 16 of the supporting member 10, the latter is placed over the casing with its slips in engagement therewith. As the load is brought on the slips, the same are forced downwardly and firmly grip the casing. Upon the removal of the load, the slips are automatically released from gripping engagement with the casing.

Means are provided, suplementary to the slips, for guarding against the casing or tubing accidently dropping into the well while being pulled. These means are preferably in the form of auxiliary gripping devices which preferably consist of vertically-swinging dogs or levers 39, of substantially L-shape, yieldingly mounted on the collector ring 30 for radial movement toward and from the casing. Each dog has a gripping face 40 and is fulcrumed on a transverse pivot pin 41 carried by a radially movable slide 42 guided in a groove or channel 43 formed in a lug 44, preferably cast integral with the collector ring, as shown in Figs. 2 and 5. At its inner end, each slide has a depending ear 45 which extends into a recess 46 formed in the bottom of the groove and terminates short of its outer end, as shown in Fig. 4. Attached to the slide-ear 45 is a screw 47 to which a coil spring 48 is applied, one end of the spring bearing against said ear and the other end against the end wall of the recess 46. This spring tends constantly to project the slide inwardly to bring its gripping dog into yielding engagement with the casing. When not in use, the dogs assume the position shown by full lines in Figs. 1, 2 and 3, in which position they are contained within the longitudinal dimensions of the slide and are clear of the casing. When it is intended to use the dogs to prevent the casing from accidently dropping into the well, they are set in the position shown by dotted lines in Fig. 3, wherein the corners of their gripping faces are held by gravity against the casing. While in this position, should the suspension cable or other part of the hoisting mechanism break, the casing will drop causing the dogs 39 to be moved by it into yielding gripping engagement therewith. As soon as the dogs take hold of the casing, the weight of the latter is transmitted to the collector ring 30, resulting in the slips being moved into firm gripping engagement with the casing and thus automatically preventing further downward movement of the same into the well.

One of the arms of each gripping dog 39 may be provided with an aperture 39ª for receiving a string or cord for actuating the same at a distance.

I claim as my invention:

1. A device of the character described, comprising a supporting member having a a tapered opening, fixed guide posts arranged in said opening, a plurality of vertically movable slips in said opening and engaging said guides, and a suspension element guided on and surmounting said supporting member and engaging said slips.

2. A device of the character described, comprising a supporting member having a stepped-opening forming a downwardly-facing shoulder, an annular row of guide pins arranged in said opening beneath said shoulder, a plurality of slips arranged in said opening and engaging said guide pins, and a suspension element guided on and surmounting said supporting member and engaging said slips.

3. A device of the character described, comprising a supporting member having a tapered opening, an annular member fitted in the lower end of said opening and extending inwardly from its wall, a plurality of guide pins rising from said annular member, and a plurality of slips arranged in said opening and engaging said guide pins 4. A device of the character described, comprising a supporting member having a tapered opening, a wear ring fitted in the lower end of said opening and extending inwardly from its wall and a plurality of slips arranged in said opening for movement lengthwise thereof to effect the expansion and contraction of the slips, the inner face of the wear ring extending inwardly beyond the gripping faces of the slips in their elevated expanded position.

5. A device of the character described, comprising a supporting member having an opening therein, a suspension ring surmounting said supporting member in axial alinement with its opening, slips arranged in said opening and carried by the suspension member, radially movable slides mounted on said suspension ring, means for yieldingly resisting outward movement of said slides, and gripping devices carried by the slides.

6. A device of the character described, comprising a supporting member having an opening therein, a yieldable suspension member mounted on said supporting member in axial alinement with its opening, a plurality of slips arranged in said opening and carried by said suspension member, radially movable slides guided on said suspension member, springs applied to said slides for resisting their outward movement, and pipe-gripping dogs fulcrumed on said slides for movement into and out of engagement with the pipe.

7. A slip for a pipe-gripping device having a horizontal groove in its outer side near one end thereof and an apertured lug extending from its outer side near the opposite end thereof.

8. A device of the character described, comprising a supporting member having a tapered opening therein, a suspension ring surmounting said supporting member and guided thereon for movement axially of its opening, yieldable means tending to move said suspension ring to its elevated position, a plurality of slips extending into said tapered opening and having grooves in their outer sides engaging the inner edge of the suspension ring, said slips being free to move radially relatively to the ring, and pipe-gripping devices supported on the top side of said suspension ring and arranged above the plane of said slips.

GUSTAVUS A. MONTGOMERY.